United States Patent [19]

Birckbichler

[11] Patent Number: 5,796,806
[45] Date of Patent: *Aug. 18, 1998

[54] APPARATUS AND METHOD FOR SPOKEN CALLER IDENTIFICATION USING SIGNALS OF THE ADVANCED INTELLIGENT NETWORK

[75] Inventor: Rich D. Birckbichler, Austin, Tex.

[73] Assignee: DSC Telecom, L.P., Plano, Tex.

[*] Notice: This patent issued on a continued prosecution application filed under 37 CFR 1.53(d), and is subject to the twenty year patent term provisions of 35 U.S.C. 154(a)(2).

[21] Appl. No.: 407,538

[22] Filed: Mar. 20, 1995

[51] Int. Cl.$^6$ .................................................. H04M 3/42
[52] U.S. Cl. .......................... 379/67; 379/207; 379/373
[58] Field of Search .................................. 379/59, 63, 67, 379/142, 201, 207, 215, 373, 374, 88

[56] References Cited

U.S. PATENT DOCUMENTS

| | | | |
|---|---|---|---|
| 4,578,540 | 3/1986 | Borg et al. | 379/40 |
| 4,899,358 | 2/1990 | Blakley | 379/67 |
| 4,922,490 | 5/1990 | Blakley | 370/110.1 |
| 5,007,076 | 4/1991 | Blakley | 379/67 |
| 5,247,571 | 9/1993 | Kay et al. | 379/207 |
| 5,263,084 | 11/1993 | Chaput et al. | 379/215 |
| 5,309,512 | 5/1994 | Blackmon et al. | 379/210 |
| 5,329,578 | 7/1994 | Brennan et al. | 379/67 |
| 5,434,906 | 7/1995 | Robinson et al. | 379/67 |
| 5,511,111 | 4/1996 | Serbetcioglu et al. | 379/207 |

OTHER PUBLICATIONS

Summa Four, Inc. Press Release –Dated Apr. 25, 1994; Entitled: GTE Telecommunication Services Introduces First SS-7 Based Cellular System that Gives Subscribers Choices; pp. 1–4; Manchester, New Hampshire, USA. Contacts: Tony Squeglia and Mike Flanagan.

Berman et al., "Perspectives on the AIN Archictecture," IEEE Communications Magazine, pp. 27–32, Feb. 1992.

Batten, "Personal Communications Services and the Intelligent Network," British Telecommunications Engineering, vol. 9, pp. 88–91, Aug. 1990.

Jabbari, "Intelligent Network Concepts in Mobile Communications", IEEE Communications Magazine, pp. 64–69, Feb. 1992.

*Primary Examiner*—Daniel S. Hunter

[57] ABSTRACT

An apparatus and method for providing spoken identification of a telephone caller on all phones of a service subscriber's telephone line. The caller's identification is spoken over a regular telephone receiver so no visual display hardware is needed. Software allows the call to be handled by the subscriber in multiple ways. Voice or keypad commands allow the subscriber to take the call, play the caller a message declining the call, route the call to a voice mail system (if available), or refer the call to some other system. Software control of the apparatus allows the call routings to be optional, flexibly configured, and extended to other capabilities in the future. Software control also allows the telephone company's billing name database to be expanded beyond what is known to the local telephone company of the subscriber. Alternatively, a predefined list of expected caller's numbers can be defined by the caller and their names recorded. Adding call screening for desired calls would also be particularly useful in the cellular environment. The caller's name, or if not available his phone number, can be spoken to the subscriber using text-to-speech technology. Alternatively, the caller could be asked to state his name and the apparatus record it and then play it back to the subscriber for caller identification.

20 Claims, 2 Drawing Sheets

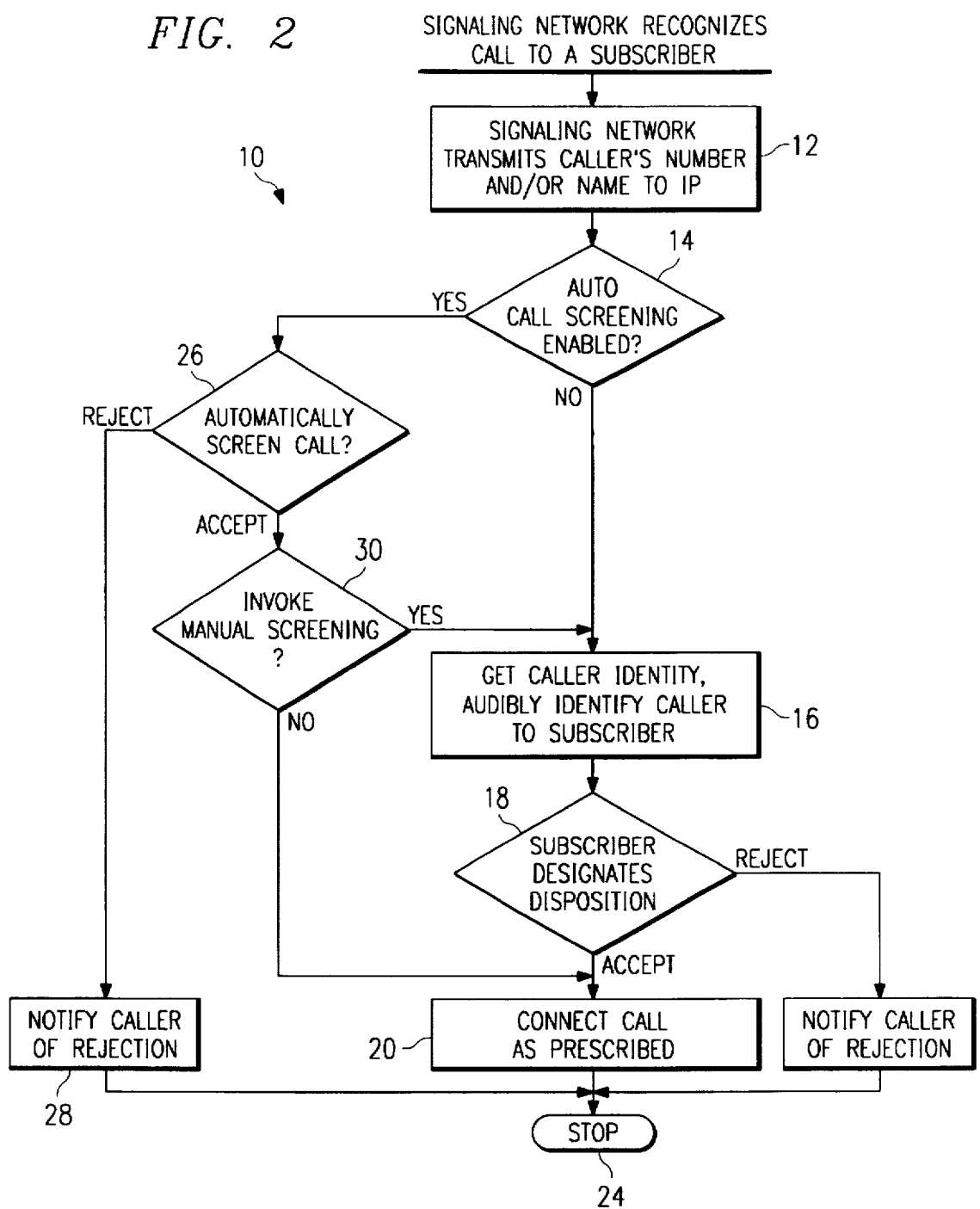

APPARATUS AND METHOD FOR SPOKEN CALLER IDENTIFICATION USING SIGNALS OF THE ADVANCED INTELLIGENT NETWORK

TECHNICAL FIELD OF THE INVENTION

The present invention relates to telephone networks. More specifically, the present invention relates to an apparatus and method for spoken caller identification using signals of the Advanced Intelligent Network.

MICROFICHE APPENDIX

A microfiche appendix is included as part of this Specification and includes two microfiche that have a total of 119 frames. The microfiche appendix includes listings of computer programs that were designed for use with the Texas Instruments Multi-Serve 4000 unit.

BACKGROUND OF THE INVENTION

Telephone service subscribers do not necessarily want to answer all the telephone calls they receive. However, in order to know what calls they are interested in answering, subscribers must know who is calling. Presently available systems display, on a special display device associated with a subscriber's telephone, the caller's phone number and billing name of the caller. This special display device is available integrated with a telephone in a single telephonic unit or as a device connected separately to an exiting telephone.

The name of the person or entity associated with the phone number can be found by a reverse directory lookup of the number in the telephone company's billing information. On some present systems, the name and/or number of the caller can be displayed on the subscriber's display device. In cases where the caller name is displayed, the names that can be displayed are limited to those that are serviced by the same telephone company as the subscriber. The visual display approach uses a data modem signal that is transmitted by the central office on the subscriber's line between the first and second ring. This necessitates a modem to encode the data at the subscriber's central office Service Switching Point and a modem built-in with the display logic at the subscriber's receiving location.

SUMMARY OF THE INVENTION

The described embodiments of the present invention provide an apparatus and method for providing spoken identification of a telephone caller on all phones of a service subscriber's telephone line. The caller's identification is spoken over a regular telephone receiver so no visual display hardware is needed. The software allows the call to be handled by the subscriber in multiple ways. Voice or keypad commands allow the subscriber to take the call, play the caller a message declining the call, route the call to a voice mail system (if available), or refer the call to some other system. Software control of the apparatus allows the call routings to be optional, flexibly configured, and extended to other capabilities in the future. Software control also allows the telephone company's billing name database to be expanded beyond what is known to the local telephone company of the subscriber. Alternatively, a predefined list of expected caller's numbers can be defined by the caller and their names recorded. Adding call screening for desired calls would also be particularly useful in the cellular environment. The caller's name, or if not available his phone number, can be spoken to the subscriber using text-to-speech technology. Alternatively, the caller could be asked to state his name and the apparatus record it and then play it back to the subscriber for caller identification.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

FIG. 2 illustrates a flowchart of a process by which spoken caller ID is accomplished in the Advanced Intelligent Network (AIN).

DETAILED DESCRIPTION OF PREFERRED EMBODIMENTS

Figure 1:
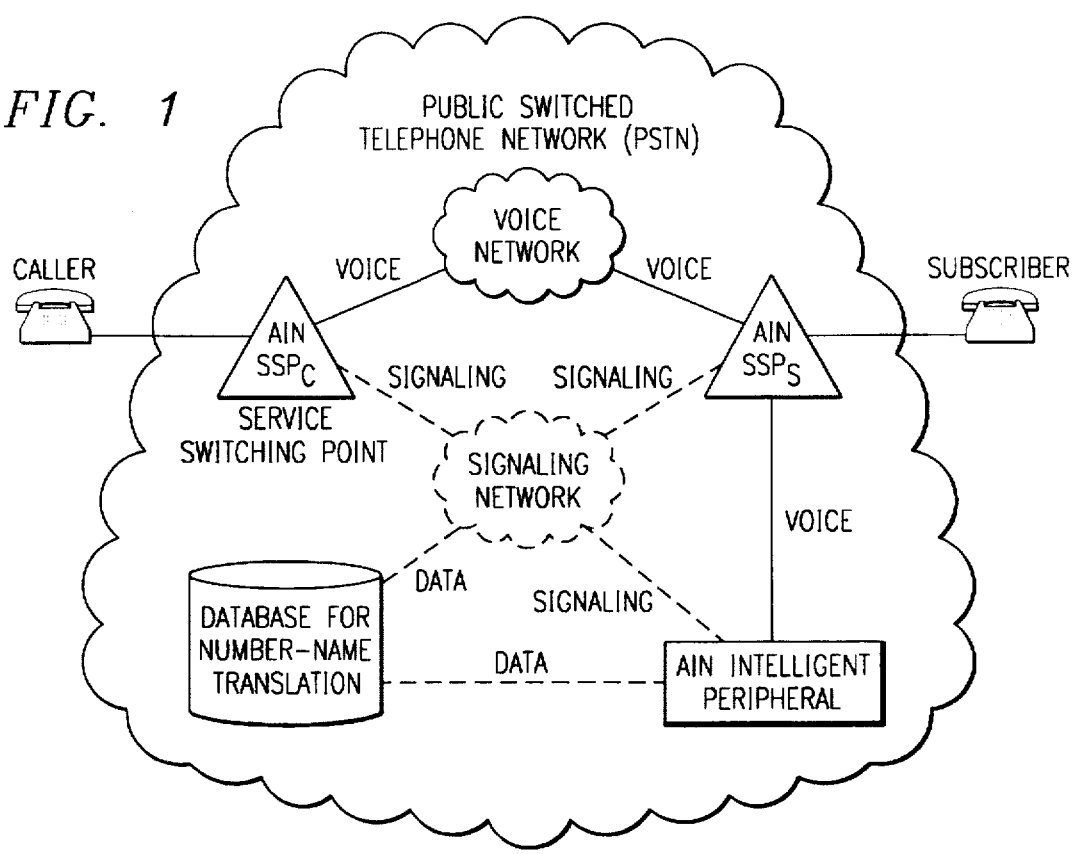
FIG. 1 illustrates a block diagram of an apparatus for spoken caller ID in the Advanced Intelligent Network (AIN).

FIG. 1 illustrates an apparatus for spoken caller ID in an Advanced Intelligent Network (AIN) implementation of a Public Switched Telephone Network (PSTN)(which presently uses an out of band signalling system called SS#7 to provide the vehicle for the intelligence of the Advanced Intelligent Network), according to one embodiment of the invention. The invention uses the information and voice processing capabilities of an AIN Intelligent Peripheral and the signaling capabilities of the Common Channel Signaling System (SS#7 at present) network to provide the spoken caller ID service. The Signal System's knowledge of the caller's phone number and possibly the associated billing name is passed to the Intelligent Peripheral (IP) that connects to the network. One example of an Intelligent Peripheral that could be used is the TI Multi-Serve 4000 unit available from Texas Instruments, Incorporated. Software (1129 plus) is loaded onto the TI Multi-Serve 4000 to allow it to perform processing for spoken caller ID.

A number-to-name textual database can extend the names known to the apparatus beyond what is known directly by the local telephone company of the subscriber. The number-to-name textual database can also be incorporated into the intelligent peripheral or connected as a separate unit. Phonebook-like databases are commercially available covering most cities in the country. The intelligent peripheral can interactively collect information for the caller and/or perform some automatic level of call screening (e.g., accept/reject based on the time of day, query caller's urgency, or even ask the caller to record his name if it is not otherwise available).

FIG. 2 illustrates a flowchart showing the process for spoken caller ID. The Signaling Network recognizes a call to a subscriber (step 10), after which it transmits the caller's number and/or name to the Intelligent Peripheral (step 12). The Intelligent Peripheral obtains the caller's name from a related data base or, if not available, prompts the caller to state his/her name for recording to be replayed to the subscriber. If automatic call screening is not enabled (step 14), the Intelligent Peripheral will verbally state the name of the caller to the subscriber (assuming the caller's name is available in a textual format) and query the subscriber for how he/she wishes to handle the call. If the caller's name is not available for one reason or another, the Intelligent Peripheral can be programmed to prompt the caller to state his name so that it can be recorded and replayed to the subscriber (not shown). The number-to-name translation step may be performed by the Signaling Network and then the text passed to the Intelligent Peripheral or the Intelligent Peripheral can perform the translation directly.

The subscriber next designates the disposition of the call (step 18), by telephone keypad tone (DTMF, Dual Tone Multi-Frequency signals) or by speaking a command. In either case, tone or voice command, the Intelligent Peripheral recognizes the desired response and handles the call as desired by the subscriber. Call handling can be simply accepting the call or rejecting the call. If the call is accepted, the Intelligent Peripheral connects the call as prescribed (step 20). If the call is not accepted, the Intelligent Peripheral will announce this handling to the caller (step 22), after which the call is terminated (step 24).

If automatic call screening is enabled (step 14), the Intelligent Peripheral can respond in one of several ways. If the Intelligent Peripheral is programmed to automatically reject one or more specific calling telephone numbers (selected by the subscriber) any calling telephone number that matches one of the rejected specific calling numbers will be rejected (step 26). The Intelligent Peripheral will announce this handling to the caller (step 28), after which the call is terminated (step 24). If an incoming call has a telephone number that does not match a rejected specific calling number, and if manual screening is not invoked (step 30), the Intelligent Peripheral connects the call as prescribed (step 20). If, however, manual screening is invoked, the Intelligent Peripheral will verbally recite the name of the caller to subscriber (assuming the caller's name is available in a textual format) and query the subscriber for how he/she wishes to handle the call (step 16). If the caller's name is not available for one reason or another, the Intelligent Peripheral can be programmed to prompt the caller to state his name so that it can be recorded and replayed to the subscriber (not shown). The number-to-name translation step may be performed by the Signaling Network and then the text passed to the Intelligent Peripheral or the Intelligent Peripheral can perform the translation directly.

The subscriber next designates the disposition of the call (step 18), by telephone keypad tone (DTMF, Dual Tone Multi-Frequency signals) or by speaking a command. In either case, tone or voice command, the Intelligent Peripheral recognizes the desired response and handles the call as desired by the subscriber. Call handling can be simply accepting the call or rejecting the call. If the call is accepted, the Intelligent Peripheral connects the call (step 20). If the call is not accepted, the Intelligent Peripheral will announce this handling to the caller (step 22), after which the call is terminated (step 24). Call handling (step 18) can also be programmed to include options beyond only accepting or rejecting the call. A few examples of options include the subscriber deferring the call to call forwarding or forwarding the call to another person or system.

Figure 3:
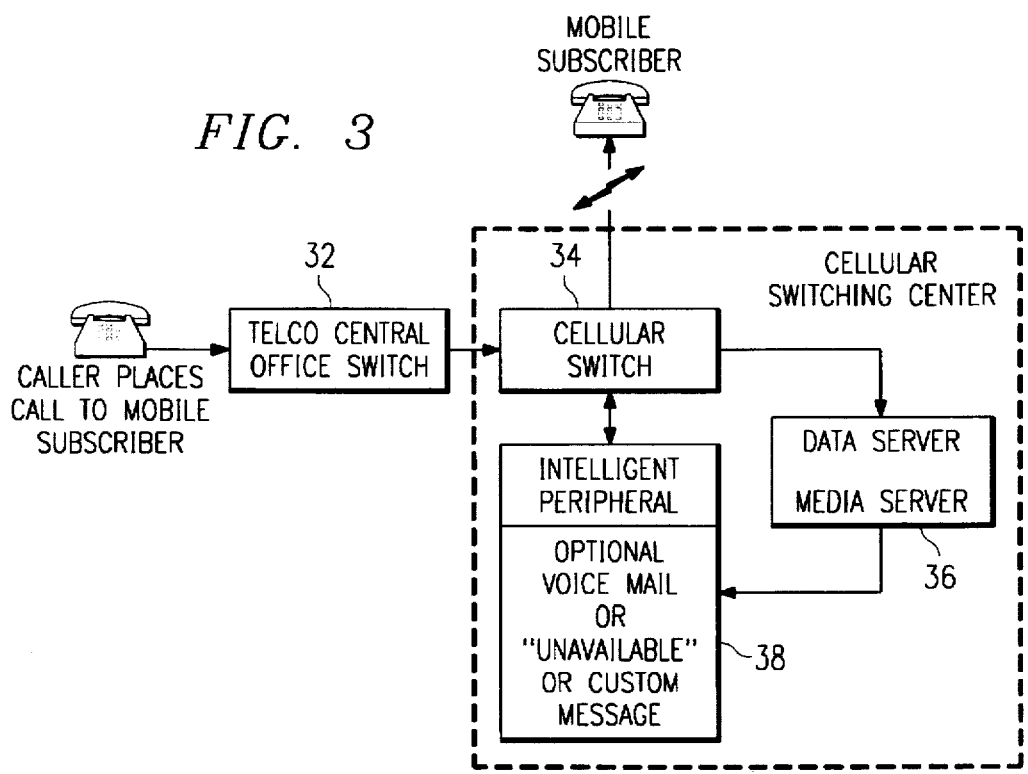
FIG. 3 illustrates a flowchart of a process by which spoken caller ID is accomplished in a cellular telephone environment.

The present invention can also be implemented in the cellular telephone environment, as shown in FIG. 3. The cellular embodiment of the invention is similar in that it exhibits similar advantages but components in the cellular office may not fully conform to the AIN architecture. When a caller places a call to a mobile subscriber, the caller's switch (32) signals the cellular switch (34) with the caller's phone number (ANI, Automatic Number Identification). The two switches may connect using the protocols of AIN or the information may be passed in-band on the voice channel.

The cellular switch (34) holds the call for the subscriber while the data for speaking the caller's identification is collected.

The caller's identification process is initiated by the cellular switch (34) sending the caller ID along with the subscriber's phone number to a data server (36)(cellular switch 36 holds the call and passes ANI ID and called phone number on data link). The data server (36) determines what spoken identification will be made available to the subscriber. The subscriber can pre-record a list of names associated with phone numbers that are expected to originate calls to the subscriber. The data server (36) also uses the ANI ID to index into this list of names to fetch the caller's pre-recorded name. If the ANI ID matches the ID of one of the expected callers, the Intelligent Peripheral (38) plays the pre-recorded name of the caller to the subscriber. If, however, the ANI ID does not match any of the expected callers, then the phone number of the caller will be spoken to the subscriber by the Intelligent Peripheral (38). While the text-to-speech operation takes place in the Intelligent Peripheral (38) attached to the cellular switch (34), it could also take place in the data server (36) if it is properly equipped with voice processing hardware. The TI Multi-Serve 4000 and Media Server/Executive Server are examples of an Intelligent Peripheral that includes the necessary voice processing capabilities (the data server function could be merged into the Intelligent Peripheral if an Intelligent Peripheral of sufficient capability is utilized).

If the AIN ID is not available from the subscriber's Telco central office switch (32), the data server (36) can simply play a message stating an "unknown caller" is calling. Alternatively, the data server (36) may indicate to the Intelligent Peripheral (38) that it initiate a dialog with the caller to record his/her name so that the name can be played to the subscriber for caller identification.

When the Intelligent Peripheral (38) has received the identification of the caller it signals the cellular switch (34) to complete the call to the mobil subscriber. The Intelligent Peripheral (38) plays the message identifying the subscriber and prompts the subscriber to indicate the desired call processing. The subscriber can respond with a DTMF key pad tone or a voice command. Depending on the disposition directed by the subscriber, different action will follow. The subscriber may defer the call by sending it to voice mail, or if voice mail is not available, having the Intelligent Peripheral (38) simply play a "called party is unavailable" message or a custom message that the subscriber has previously recorded. After the message is played, the connections from the cellular switch (34) to the caller and the Intelligent Peripheral (38) are dropped. If voice mail is selected, the caller is connected to the voice mail system. If the subscriber elects to accept the call, the intelligent peripheral (38) instructs the cellular switch (34) to connect the caller through to the subscriber. The cellular switch (34) then drops the link to the intelligent peripheral (34) after this connection is made.

The present invention is novel because it combines existing technology and information in a new manner to audibly identify a caller and recognize subscriber spoken commands to prescribe call disposition. The call disposition can be established by a call screening process that can simply involve a subscriber's immediate desire to take or not take a call or some parameterized process the subscriber has specified earlier (e.g., more sophisticated screening might involve the time of day, ability of the caller to provide special identification, caller specified urgency, etc.). Advantages over existing caller ID services include: 1) No special hardware need be purchased and installed by the subscriber because the service uses the audio receive capabilities present in all telephones. Consequently, the service is automatically present on all telephone instruments on the subscriber's line, not just specially-equipped phones; 2) Multiple call handling options may be offered to the subscriber to act on the call based on the caller's phone number and/or other information that can be collected from the caller or information databases (versus just answer or not of today's visual service); 3) A personal directory of recorded caller names to be indexed by caller ID may be created; 4) Call handling options can be selected by the subscriber using a voice command; 5) Employs an extension of today's standard AIN protocol to deliver the service; and 6) The known phone numbers and names of callers may be extended beyond just those in the service area of the subscriber's telephone company.

While several implementations of preferred embodiments of the invention have been shown and described, various modifications and alternate embodiments will occur to those skilled in the art. For example, pre-AIN implementations of the public switched telephone network can use implementations based on enhanced service platforms other than an intelligent peripheral. These might be adjunct processors or service nodes that are in some manner attached to central office switches and the signaling network. AIN-based implementations will use standardized AIN protocols for communicating with the central office switches (known as service switching points in the AIN) and the service control point of the signaling network.

A similar caller identification mechanism can also be applied to private branch exchanges (PBXs). Similar apparatus and software can apply to calls that are totally contained within these exchanges or calls that are originated from the public switched telephone network (PSTN). This is illustrated in the cellular embodiment of the invention where the call originates from outside the cellular network. There can be similar signaling, apparatus, and software within the private exchange to provide spoken caller identification to the PBX connected user (i.e., analogous to the "subscriber" in the AIN and cellular embodiments). Accordingly, it is intended that the invention be limited only in terms of the appended claims.

What is claimed:

1. A telephone system, comprising:
  a first advanced intelligent network (AIN) service switch point connected to a first telephone;
  a second advanced intelligent network (AIN) service switch point connected to a second telephone;
  a voice network coupling the first (AIN) service switch point to the second (AIN) service switch point;
  an intelligent peripheral system connected to the first (AIN) service switch and including an intelligent peripheral and a data server, the data server resident to the intelligent peripheral system and operable to store a plurality of data sets, the data sets including a caller number and associated customer name, the intelligent peripheral operable to process a call from a caller at the second telephone and to receive caller identification information identifying the caller number associated with the second telephone, the intelligent peripheral operable to query the data server to provide an associated customer name stored in a data set with the caller number, the intelligent peripheral operable to initiate the first (AIN) service switch to connect the intelligent peripheral to a called party at the first telephone and to audibly deliver the customer name to the first telephone; and a signaling network coupled to the first (AIN) service switch, the second (AIN) service switch and the intelligent peripheral system, the signaling network operable to communicate the caller identification information to the intelligent peripheral.

2. A method for providing spoken caller identification for a call in a switched telephone network, comprising the steps of:
  receiving signals at a service switching point connected to a called party's telephone from a signaling network of the switched telephone network, the signals including a caller's phone number;
  holding the call for the called party at the service switching point while data for speaking a customer name associated with the caller's phone number is collected from a data server resident to an intelligent peripheral system connected to the service switching point;
  audibly sending the customer name from the intelligent peripheral system to the called party; and
  requesting the called party to indicate the desired call processing of the call.

3. A method for providing spoken caller identification for a call in a cellular telephone network, comprising the steps of:
  receiving signals at a called party switch connected to a called party's telephone from a signaling network, the signals including a caller's phone number;
  holding the call for the called party at the called party's switch while data for speaking a customer name associated with the caller's phone number is collected from a data server resident to an intelligent peripheral system connected to the called party's switch;
  audibly sending the customer name from the intelligent peripheral system to the called party; and
  requesting the called party to indicate the desired call processing of the call.

4. An intelligent peripheral system connected to a first central office switch of a switched telephone network, the intelligent peripheral system comprising:
  a data server resident to the intelligent peripheral system and operable to store a plurality of data sets, the data sets including a caller number and associated customer name;
  an intelligent peripheral operable to process a call from a caller at a second telephone coupled to the switched telephone network through a second central office switch, the intelligent peripheral operable to receive caller identification information from a signaling network of the switched telephone network identifying the caller number associated with the second telephone and to query the data server to provide an associated customer name stored in a data set with the caller number, the intelligent peripheral operable to initiate the first central office switch to connect the intelligent peripheral to a called party at a first telephone connected to the switched telephone network at the first central office switch and to audibly deliver the customer name to the first telephone.

5. The intelligent peripheral system of claim 4, wherein the first central office switch is a mobile switching center of a wireless network.

6. The intelligent peripheral system of claim 4, wherein the second central office switch is a mobile switching center of a wireless network.

7. The intelligent peripheral system of claim 4, wherein the first central office switch and the second central office switch are mobile switching centers of a wireless network.

8. The intelligent peripheral system of claim 4, wherein the intelligent peripheral audibly delivers the customer name to the first telephone using text-to-speech technology.

9. The intelligent peripheral system of claim 4, wherein the intelligent peripheral is operable to perform call handling in response to receiving instructions from the called party at the first telephone.

10. The intelligent peripheral system of claim 9, wherein the call handling of the intelligent peripheral includes connecting the caller at the second telephone to the called party at the first telephone in response to receiving predefined instructions from the called party.

11. The intelligent peripheral system of claim 10, wherein the predefined instructions from the called party are received and processed at the intelligent peripheral using voice recognition technology.

12. The intelligent peripheral system of claim 10, wherein the call handling of the intelligent peripheral allows the called party to accept or reject the call.

13. The intelligent peripheral system of claim 10, wherein the call handling of the intelligent peripheral includes the option of playing the caller at the second telephone a message declining the call.

14. The intelligent peripheral system of claim 10, wherein the call handling of the intelligent peripheral includes the option of routing the caller at the second telephone to a voice mail system.

15. The intelligent peripheral system of claim 4, wherein the intelligent peripheral is operable to query the signaling network of the switched telephone network for the customer name associated with the caller number when the data server is unable to provide the customer name associated with the caller number.

16. The intelligent peripheral system of claim 4, wherein the intelligent peripheral is operable to audibly deliver the customer number to the first telephone using text-to-speech technology when the data server is unable to provide the customer name associated with the caller number.

17. The telephone system of claim 1, wherein the intelligent peripheral is operable to query the caller to state a name and to audibly deliver the name to the called party when the data server is unable to provide the customer name associated with the caller number.

18. The method of claim 2, wherein the holding the call step includes querying the caller to state a name when the data server is unable to provide the customer name associated with the caller number, and the audibly sending step includes audibly sending the name to the called party.

19. The method of claim 3, wherein the holding the call step includes querying the caller to state a name when the data server is unable to provide the customer name associated with the caller number, and the audibly sending step includes audibly sending the name to the called party.

20. The intelligent peripheral system of claim 4, wherein the intelligent peripheral is operable to query the caller to state a name and to audibly deliver the name to the called party when the data server is unable to provide the customer name associated with the caller number.

* * * * *